(No Model.) 3 Sheets—Sheet 1.
G. N. TODD.
PICKER STEM FOR COTTON HARVESTERS AND MECHANISM FOR OPERATING THE SAME.
No. 456,173. Patented July 21, 1891.
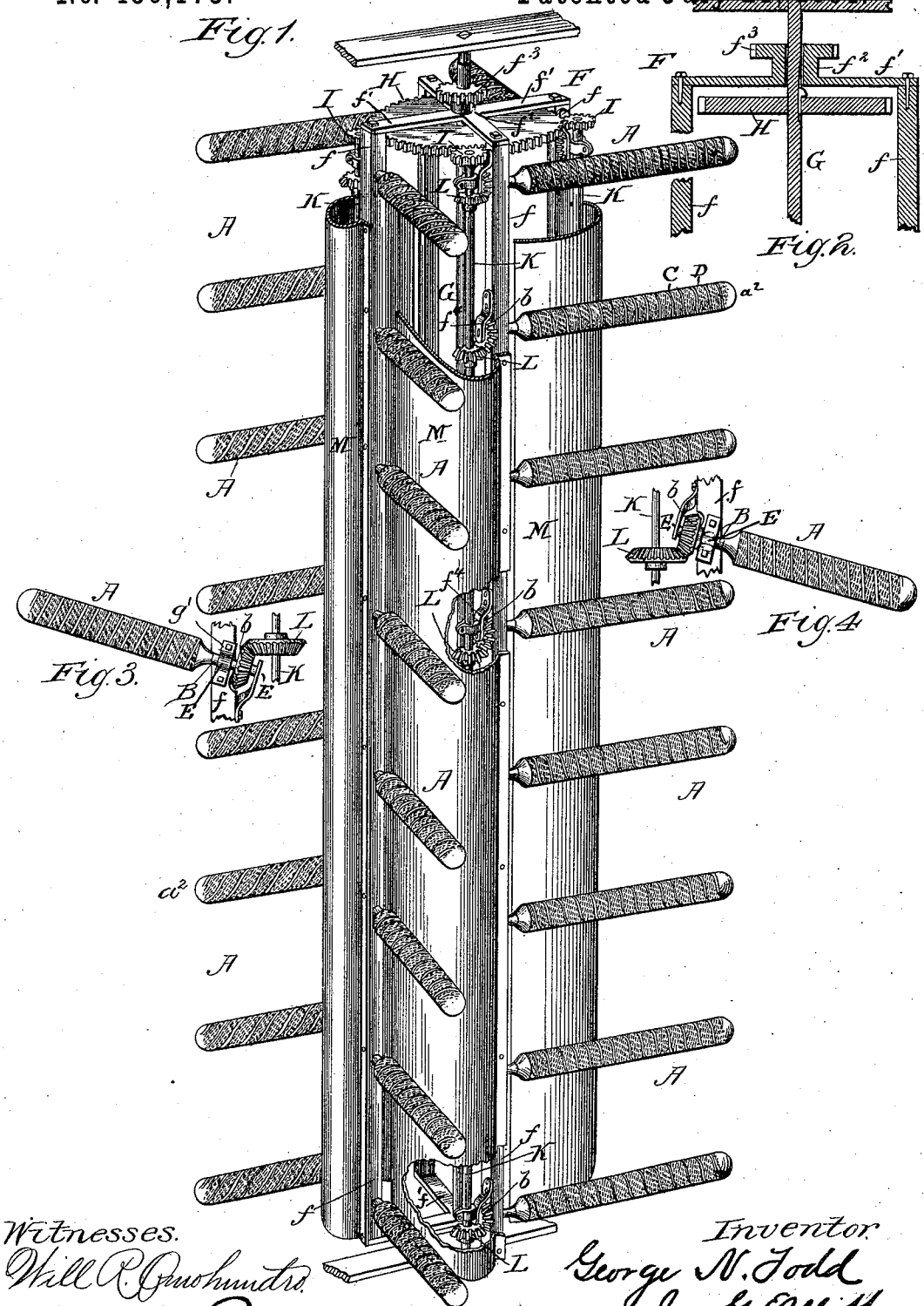
Witnesses.
Will R. Quohundrd.
Chas. G. Page.
Inventor.
George N. Todd
By, Jno. G. Elliott
Atty.

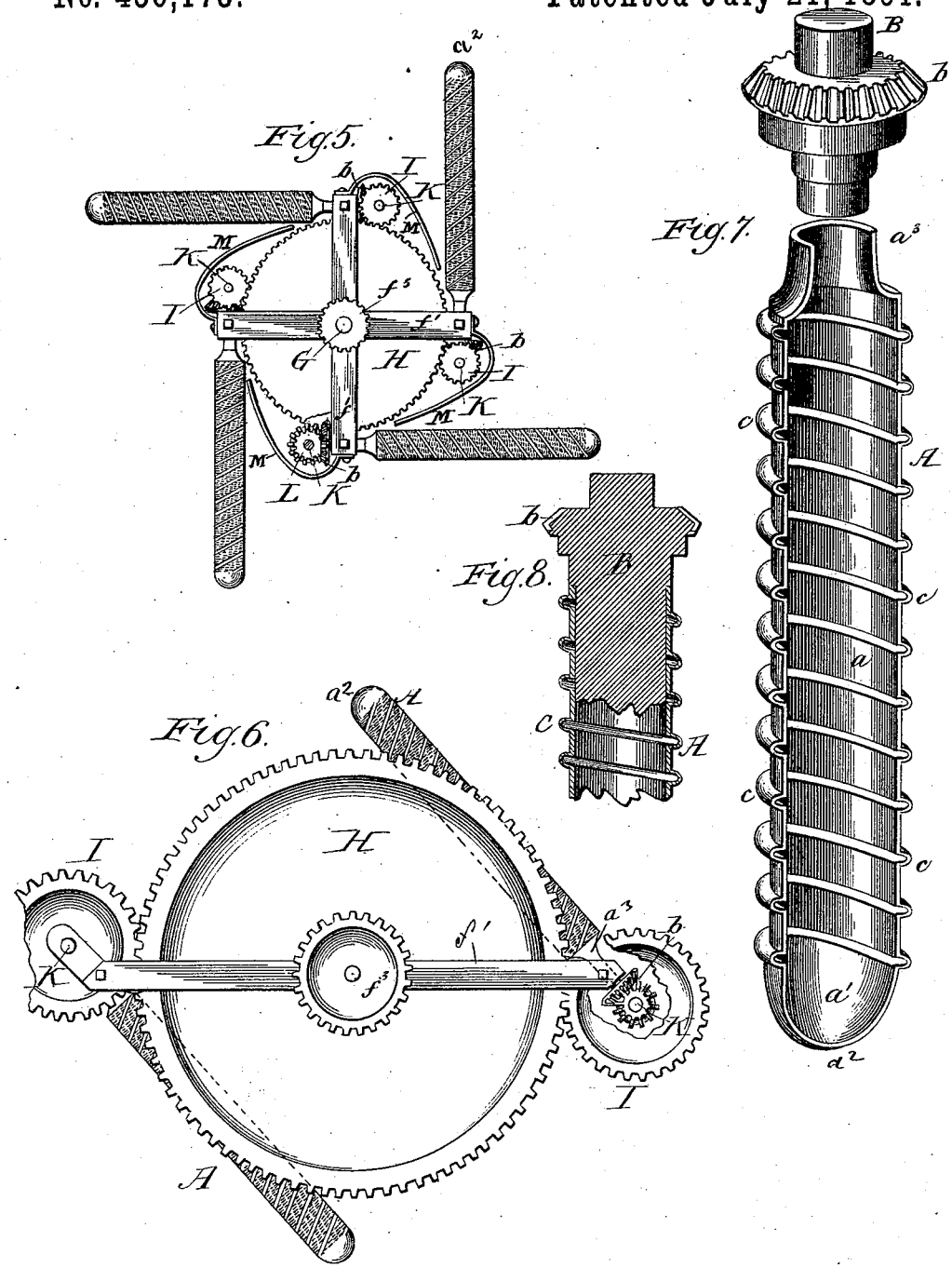
(No Model.) 3 Sheets—Sheet 2.
G. N. TODD.
PICKER STEM FOR COTTON HARVESTERS AND MECHANISM FOR OPERATING THE SAME.
No. 456,173. Patented July 21, 1891.

(No Model.) 3 Sheets—Sheet 3.
G. N. TODD.
PICKER STEM FOR COTTON HARVESTERS AND MECHANISM FOR OPERATING THE SAME.
No. 456,173. Patented July 21. 1891.
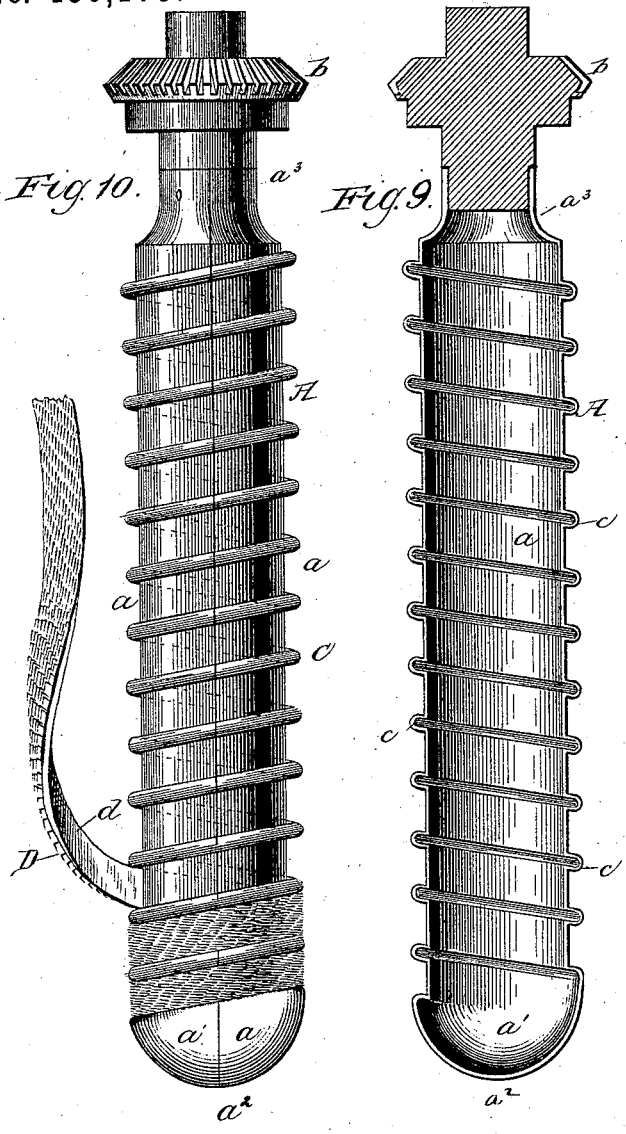
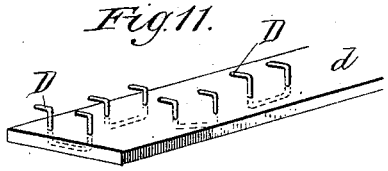
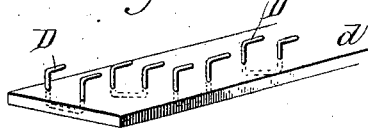
Witnesses.
Will R. Cushendro.
Chas. G. Page.
Inventor:
George N. Todd.
By Jno. G. Elliott
Atty.

UNITED STATES PATENT OFFICE.

GEORGE N. TODD, OF NEW YORK, N. Y., ASSIGNOR TO THE TODD COTTON HARVESTER COMPANY, OF ILLINOIS.

PICKER-STEM FOR COTTON-HARVESTERS AND MECHANISM FOR OPERATING THE SAME.

SPECIFICATION forming part of Letters Patent No. 456,173, dated July 21, 1891.

Application filed September 25, 1884. Serial No. 143,952. (No model.)

*To all whom it may concern:*

Be it known that I, GEORGE N. TODD, a citizen of the United States, residing in New York, county of New York, and State of New York, have invented certain new and useful Improvements in Cotton-Harvesters, of which the following is a specification.

This invention relates to an improvement in picker-stems and means for operating the same in that class of cotton-harvesters in which several sets or series of small cylindrical toothed picker-stems are rotated about their respective axes and at the same time the sets of stems successively thrust in between the branches of the plants, so as to present the picking-faces of the stems to the cotton.

One object of my invention is to so dispose a guard in the picking-face of the stem that the branches of the plants shall be warded off from the picker-teeth, no matter what position the stem may assume between the branches, and at the same time some portion of the picking-face be at all times in readiness to pick the cotton. For this purpose I provide the picker-stems with spiral guards, running continuously from end to end of the stem.

A further object is to provide a light, strong, and simple construction of stem, which can be readily spun, stamped, or struck up with a spiral guard, and to such end I form the stem of two halves of sheet metal, each spun, stamped, or struck up with oblique beads or ribs, which, when the halves are fitted together to form a tube, meet at their ends, so as to form a continuous spiral bead constituting a guard.

Further objects are to provide a novel construction of blunt entering point, which I attain by forming the latter in two halves, respectively formed with the halves of the body of the stem; to provide a light and durable construction of stem and shaft, which I attain by fitting one end of a short shaft in one end of the tubular stem, and to provide means for steadying the stem and allowing it to operate freely and easily, which I accomplish by mounting the shaft of the stem in two bearings, between which a pinion is received on the shaft.

Further objects are to provide an effective arrangement of axially-rotating stems and means by which said stems are caused to revolve around a common axis, and to provide certain novel features of construction and combinations in a mechanism for supporting and operating the stems, as hereinafter described and claimed, and illustrated in the drawings, in which—

Figure 1 represents in perspective the picker-stems with mechanism for supporting and operating the same. Fig. 2 is a longitudinal section showing one end of the picker-frame and adjacent parts. Figs. 3 and 4 are details showing pickers assuming slightly different positions from the pickers illustrated in Fig. 1. Fig. 5 is a top plan view of the devices shown in Fig. 1. Fig. 6 is a plan view of a modified arrangement of the same. Fig. 7 is a section showing one form of one of the halves of a picker-stem. Fig. 8 is a longitudinal section through one end portion of a stem of another form and the shaft secured therein. Fig. 9 is a longitudinal section through the stem and shaft shown in Fig. 7. Fig. 10 shows the same picker-stem with a toothed band applied thereto; Figs. 11 and 12, enlarged detail views of portions of the flexible strap containing the picker-teeth, illustrating two ways of setting the teeth into the straps, the former showing the teeth extending transversely of the strap and the latter longitudinally.

The picker-stem A consists of a metal tubular body formed of two halves $a$, which are spun or stamped out separately from each other and then secured together by means of solder or other suitable fastening medium, so as to form a complete tube. At one end of this tube it is essential to form a blunt entering point for the stem, so that the latter can enter the bushes without injuring the same. For this purpose I form the stem with an approximately hemispherical entering end, each half $a'$ of which, Figs. 7, 9, and 10, is made integral with one of the halves of the tubular body of the stem, so that when the halves of the tubular body are fitted together their part spherical ends shall form a rounded or hemispherical entering point $a^2$ for the stem. At its opposite end this tubular stem is fitted and secured on a short shaft or axle B, which is provided with a bevel gear-wheel b, rigidly secured thereon. The preferred mode of connecting this shaft with the stem is to form the tubular body of the stem straight at the rear end in which the shaft is fitted, as shown in Fig. 8, in which way a firm connection between the stem and shaft can be established, and also whereby the shaft can be extended to any desired length within the stem, thereby strengthening the latter and avoiding the possibility of any accidental disconnection between the stem and the shaft.

In Figs. 7, 9, and 10 I have shown the tubular body of the picker-stem contracted at one end to form a neck $a^3$, in which one end of the shaft is fitted up to a shoulder on the latter and the said neck secured on the shaft by screws or rivets; but I prefer, however, the arrangement shown in Fig. 8, in which, while the shaft can be passed into the stem up to a shoulder on the shaft, that portion of the latter fitting in the stem can be made equal in diameter to the internal diameter of the body of the stem.

The construction of stem herein shown admits of guards being struck up or otherwise formed with a tubular stem, and enables me, therefore, to provide a light and strong picker-stem. In order to provide this tubular stem with guards rising substantially to the level of the outer ends of the picker-teeth, with which the stem is provided, I form each half of the tubular body of the stem with a series of external ribs or ridges c, Figs. 7 and 9, arranged obliquely to the length of the stem and disposed so that when the two halves of the tubular body are fitted together to form a complete tube the ends of these short ribs shall meet, so as to form a continuous guard C, running spirally around the stem substantially from end to end thereof. In order to provide the stem with picker-teeth rising to about a level with the spiral guard, I secure the teeth D in a flexible strap or band d and wind this toothed strap or band spirally upon the tubular body in the space unoccupied by the spiral guard thereon. This toothed strap is of a width sufficient to practically fill up said space unoccupied by the spiral guard, in which way I provide the novel feature of a picker-stem for a cotton-harvester having a narrow spiral guard running continuously from end to end of the picker-stem, whereby each picker-stem shall present to the plants a picking-surface extending from end to end of the stem and occupying the greater portion of the face, and at the same time interrupted by an unbroken guard. It will be obvious that so far as this result is concerned the spiral guard could be made separate from and secured in any suitable way to the tubular body of the stem; but in considering the durability of the guard as a fixture on the stem and the cheapness and facility with which the stem can be provided with a spiral guard the feature of the guard struck up with the stem is an important one. I may here state, however, that so far as relates to the broad idea of my invention—namely, providing guards on the picker-stems between which rise yielding picking-teeth, and in a more limited sense the providing of guards for the stem, to which stem yielding picking-teeth are attached by being secured to a strap or band wound upon the stem—it is not necessary that the guards should be of spiral form or struck up out of the metal forming the body of the stem, for, as before stated, the guards may be formed spirally and secured to the stem either before or after the attachment of the strap or band to which the picker-surface is secured, and may be of any form which will accomplish the desired purpose of guarding the picking-surface, whether they extend spirally, longitudinally, transversely, or in any other suitable arrangement. The picking-surface may be bent, curved, or upright teeth, or such other material as may possess engaging points formed with or secured to a strap, band, cord, wire, or other bandage, so as to be of a yielding, elastic, or flexible nature, and rising to about a level with the guards or ribs. The picker-stems are carried by a revolving support.

In order to prevent the rotary picker-stems from sagging, and also to cause them to work true and easily, I provide a pair of bearings E for each one of the picker-stem shafts B, and arrange the bevel-gear on the shaft at a point intermediate of the two bearings, one of said bearings being a bar or other fixed portion of a revolving frame or support for the picker-stems, hereinafter described, while the other bearing is a detachable bracket or equivalent bearing attached to the said bar or frame, so as to give the axle of the picker-stem a double bearing. The manner of journaling the picker-stems, however, is immaterial, for, as shown in Fig. 1, the axle or journal of the stems may have a bearing in the bar f and a bracket $f^4$ attached to said bar, with the gear on the journal between the bar and bracket; or it may have a bearing at one side of the bar and be held in position by means of a half-bearing or cap $g'$, attached to the bar, as illustrated in Figs. 3 and 4. In this way the bevel-bears are maintained under all circumstances in a fixed relative position to the driving-gears engaging them, and hence the shaft and picker-stems thereon will be kept steady during operation.

The revolving support illustrated in Figs. 1, 2, and 5 consists of a frame F, the sides of which are composed of a set of longitudinal bars f, and the ends of a set of arms $f'$, radiating from a hub $f^2$ at each end of the frame and constituting supports for the longitudinal bars. This rotary frame is arranged to revolve on a central fixed axle G, and can be operated from any suitable arrangement of driving-gear connected with a gear $f^3$, which is rigid with one of the end hubs of the rotary frame. Said driving-gear can also be connected with one of the wheels of a cotton-harvester, so that when the latter is drawn through the field the revolving frame will be operated, and hence the picker-stems carried thereby be revolved around a common axis.

In order to effect the independent axial rotation of the pickers, the central fixed axle G is provided at a point near one end of the revolving frame with a fixed gear-wheel H, with which a set of small gears I, secured upon line-shafts K, are arranged to engage. These line-shafts extend substantially from end to end of the rotary frame and are mounted in suitable bearings carried by the said frame, in which way when the frame is revolved about the central stationary axle the gears I on the rotary line-shafts will, in traveling around the large gear fixed on the central stationary axle, necessarily revolve about their axes, and hence cause a like individual rotation on the part of the line-shafts. Each one of these line-shafts is provided with a set of bevel-gears L, engaging the bevel-gears $b$ of a set of rotary picker-stems, so that during the revolution of the rotary frame or support for the pickers, and the consequent axial rotation of the line-shafts carried by the revolving support, each picker-stem will be rotated about its own axis.

The picker-stems are arranged in sets about the rotating frame. Each picker-stem is arranged and at all times maintained at right angles, or substantially so, to the frame and bars which support them tangential to the path of rotation of the points of support, as illustrated in Figs. 1 and 5, although it will be evident that they can be set oblique to the said supporting-bars, as shown in Figs. 3 and 4. In Figs. 1 and 5 I have shown four series so disposed that each series is in a plane at right angles to the plane of the next succeeding series.

In order to prevent the branches of the plants and the bolls thereon from catching in the mechanism which operates the picker-stems, I provide a set of shields M, consisting of curved plates extending substantially from end to end of the frame and secured to the longitudinal side bars thereof, so as to cover and protect the line-shafts and gearing. The rotary support thus provided with picker-stems can be mounted at any suitable angle on a wheeled frame or carriage which will be drawn through the field so as to present the picker-stems to the plants, and thereby allow the sets of stems to be successively thrust in between the plants and drawn out therefrom so as to admit of the rotary picker-stems effectively picking the cotton.

It will be seen that, owing to the general revolution of the sets of stems about a central axis which is being moved along the row of plants, the stems will enter and leave the row of plants without bending the latter to any objectionable extent, since the picker-stems will simply be thrust in and drawn out from between the plants as the revolving support is moved along the row.

In conclusion I will observe that by my arrangement of picker-stems and mechanism for rotating the stems about their axes, and at the same time about a common axis, the pickers are not dependent for their action on the fact of their being maintained in a pendent position from a revolving frame, as has in some instances heretofore been attempted in cotton-harvesters. Hence while one or more rotary frames provided with picker-stems and mechanism for operating the same in accordance with my invention can be employed in a single machine, the rotary frame can be arranged with its axis either vertical, inclined, or horizontal, and in either of these positions present the picker-stems to the rows of plants, so that the stems shall be thrust in and drawn out without injury to the plants and without breaking the same, so as to destroy any of the bolls of unripe cotton which it is desired to have ripen.

Having described my invention, what I claim, and desire to secure by Letters Patent, is—

1. A rotatable picker-stem having guards and yielding picking-teeth rising between said guards, substantially as described.

2. A rotatable picker-stem having guards and a toothed strap, the teeth of which rise between said guards, substantially as described.

3. A rotatable picker-stem having guards or ribs and a series of picker-teeth secured to a strap or band, which latter is attached to the body of the stem, so that the teeth will project between the guards or ribs, substantially as described.

4. A rotatable picker-stem provided with guards or ribs and yielding picking-teeth alternating with said guards, substantially as described.

5. A rotatable picker-stem having guards or ribs and a strap or band secured to said stem, provided with picking-teeth projecting between the guards or ribs, the points of said teeth lying in substantially a plane with the outer surface of said guards, substantially as described.

6. A rotatable picker-stem having a card-clothing strap or band provided with teeth wound about its body, and guards or ribs arranged between said teeth and rising to a plane with the points of the teeth, substantially as described.

7. A rotatable picker-stem having guards or ribs and a strap or bandage secured to said stem, provided with a picking-surface projecting between the guards or ribs, the engaging points of said picking-surface lying in substantially a plane with the outer surface of said guards, substantially as described.

8. A cylindrical picker-stem for a cotton-harvester, having its operating-face composed of picker-teeth, with a spiral guard running continuously from end to end of the stem and substantially flush with the acting ends of the teeth, substantially as described.

9. The cylindrical picker-stem provided with a spiral guard running from end to end thereof and a toothed strap wound spirally about the stem in the space unoccupied by the spiral guard, substantially as described.

10. A tubular metal picker-stem provided with a spiral guard running from end to end thereof, and consisting of a rib formed integral with the body of the stem, substantially as described.

11. A tubular metal picker-stem composed of two equal portions, each formed with oblique ribs which, when the two equal portions are secured together to form a tube, constitute a spiral guard running from end to end of the stem, substantially as described.

12. The tubular picker-stem, in combination with the shaft secured within one end of the same, substantially as described.

13. The tubular metal picker-stem composed of two equal portions secured together and provided with a rounded entering point, each half of which is made integral with one of the body portions of the stem, substantially as described.

14. In a cotton-harvester, the combination of the tubular metal picker-stem, the shaft secured to one end of said picker and provided with a pinion, and two bearings for said shaft, one on each side of said pinion, substantially as described.

15. In a cotton-harvester, the combination of the revolving supporting-frame, the picker-stems carried by said frame and held at all times in a position tangential to the path through which their supports rotate, and means for rotating said picker-stems on their own axes, substantially as described.

16. The revolving supporting-frame, the picker-stems carried on said frame and arranged in sets in planes parallel with the axis of said supporting-frame, said planes being maintained in substantially the same position relative to the support throughout the revolution of the support, their position being such that the stems will enter the cotton-plants in substantially the direction of their length, and means for rotating said stems on their own axes, substantially as described.

17. The combination of the fixed gear, the rotating frame, the axially-rotating picker-stems supported in said frame and provided with pinions, and the shafts also carried by said frame, and each provided with the pinion engaging said fixed gear-wheel and with pinions engaging pinions on the picker-stems, substantially as described.

18. The combination of a fixed shaft, the rotary frame mounted on said shaft, the rotating picker-stems mounted on said frame and provided with pinions, the gear-wheel secured to said frame-shaft, and the shafts carried by said rotary frame and provided with pinions engaging the fixed gear-wheel and with pinions on the picker-stems, substantially as described.

GEORGE N. TODD.

Witnesses:
W. W. ELLIOTT,
JNO. G. ELLIOTT.